United States Patent [19]
Yokoe et al.

[11] Patent Number: 4,919,062
[45] Date of Patent: Apr. 24, 1990

[54] DATA PROCESSOR FOR USE IN SEWING MACHINE

[75] Inventors: Masaaki Yokoe; Tomoe Takagi, both of Nagoya; Narihiro Matsushita, Kasugai; Yuzo Takagi, Nagoya, all of Japan

[73] Assignee: Brother Kogyo Kabushiki Kaisha, Aichi, Japan

[21] Appl. No.: 409,923

[22] Filed: Sep. 20, 1989

[30] Foreign Application Priority Data

Sep. 22, 1988 [JP] Japan .................................. 63-237861

[51] Int. Cl.$^5$ ............................................. D05B 21/00
[52] U.S. Cl. ................................ 112/121.12; 112/454; 112/103; 364/470
[58] Field of Search ...................... 112/121.11, 121.12, 112/262.3, 266.1, 454, 457, 445, 78, 86, 98, 102, 103; 364/470

[56] References Cited

U.S. PATENT DOCUMENTS

| | | | |
|---|---|---|---|
| 4,388,883 | 6/1983 | Hirota et al. | 112/121.12 |
| 4,557,207 | 12/1985 | Turner et al. | 112/226.1 |
| 4,622,907 | 11/1986 | Kimura | 112/121.12 |
| 4,823,714 | 4/1989 | Yokoe et al. | 112/103 X |
| 4,849,902 | 7/1989 | Yokoe et al. | 112/121.12 X |

Primary Examiner—Peter Nerbun
Attorney, Agent, or Firm—Oliff & Berridge

[57] ABSTRACT

Desired individual letter codes indicative of letter to be stitched on a piece of cloth by a sewing machine are selected and entered in relation to the character stitching sequence through a keyboard. Then, character identification codes are constructed according to a predetermined stitching sequence based on the entered individual letter codes and stored outer profiles. Stitch pattern data corresponding to the constructed character identification codes are read out from a memory, and used to control the sewing machine to produce the desired letters having different outer profiles.

9 Claims, 6 Drawing Sheets

| CHARACTER ID CODE | STITCH PATTERN DATA |
|---|---|
| 1000 | |
| 1001 | CHARACTER "A" OF FONT L |
| 1101 | CHARACTER "B" OF FONT L |

FIG. 3(b)

| CHARACTER ID CODE | STITCH PATTERN DATA |
|---|---|
| 5000 | |
| 5001 | CHARACTER "A" OF FONT C |
| 5101 | CHARACTER "B" OF FONT C |

FIG. 3(c)

| CHARACTER ID CODE | STITCH PATTERN DATA |
|---|---|
| A000 | |
| A001 | CHARACTER "A" OF FONT R |
| A101 | CHARACTER "B" OF FONT R |

FIG. 3(g)

| TWO-LETTER MARK | | THREE-LETTER MARK | |
|---|---|---|---|
| STITCHING ORDER | 1000 | STITCHING ORDER | 1000 |
| STITCHING ORDER | A000 | STITCHING ORDER | 5000 |
| | | STITCHING ORDER | A000 |

FIG. 3(e)

| INDIVIDUAL CHARACTER CODE | |
|---|---|
| CHARACTER "A" | 0001 |
| CHARACTER "B" | 0101 |

FIG. 3(f)

| CG MEMORY | |
|---|---|
| INDIVIDUAL CHARACTER CODE | |
| 0001 | DISPLAY DATA FOR CHARACTER "A" |
| 0101 | DISPLAY DATA FOR CHARACTER "B" |

FIG. 3(d)

| FONT CODE | LEADING ADDRESS OF MEMORY AREA ASSIGNED TO CHARACTER GROUP |
|---|---|
| FONT L CODE | OF FONT L: 1000 |
| FONT C CODE | OF FONT C: 5000 |
| FONT R CODE | OF FONT R: A000 |

FIG. 4

DATA PROCESSOR FOR USE IN SEWING MACHINE

BACKGROUND OF THE INVENTION

The present invention relates to a sewing machine, and more particularly to a data processor for processing input data entered through a keyboard to produce stitch pattern data used for sequentially stitching letters on materials with a sewing machine.

Figure 6A:
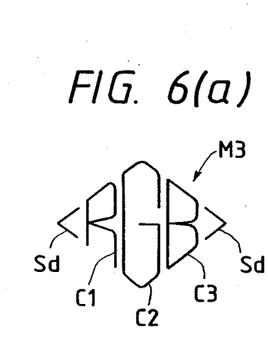
FIG. 6(a) is a diagram showing a stitch pattern of a three-letter mark.
Figure 6B:
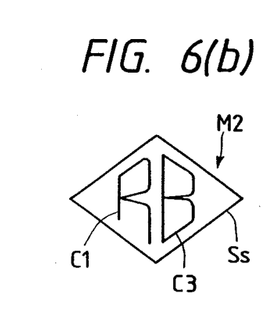
FIG. 6(b) is a diagram showing a stitch pattern of a two-letter mark.

FIGS. 6(a) and 6(b) show fancy stitches, or three-letter and two-letter marks M3, M2, for initials composed of symbols and alphabetical letters. To form these illustrated stitches, it is desirable to sew an outer symbol or pattern Sd which looks like inequality signs and an outer symbol Ss of a lozenge shape, and also to sew letters or characters C1 through C3 of different fonts or outlines at lefthand, central, and righthand positions between the outer symbols Sd (FIG. 6(a)) or at lefthand and righthand positions within the outer symbol Ss (FIG. 6(b)). By thus producing the stitches, the resultant stitch patterns have appealing designs.

U.S. Pat. Nos. 4,388,883, 4,557,207 and 4,622,907 disclose sewing machines including a data generator which can selectively generate stitch pattern data for alphabetical letters of a desired font or outline. For entering such stitch pattern data, a font code is first entered to select a desired font, and then individual character codes are entered to thereby select desired characters or letters from a group of characters or letters of the selected font.

Specifically, U.S. Pat. No. 4,388,883 discloses a stitch pattern sewing machine provided with a memory in which stored are sewing pattern data representative of a plurality of characters and symbols, such as English letters, Japanese Katakana letters, for each of stitch patterns, together with identification codes for those characters and symbols. With the identification codes, desired stitch pattern data are read out from the memory, and the data thus read our are modified as the case commands, to for example enlarge, reduce or rotate the data. Based on the stitch density and arrangement data for the stitch pattern, sewing data or needle position data for each needle are produced. Thereafter, in timed relation with the vertical movements of the needle, the needle and the workpiece are relatively moved in accordance with the sewing pattern data. To this end, a keyboard is provided for entering the characters, in which keys are changeable between an alphabetical mode and a Japanese character mode for allowing to enter both type of letters. While it may be possible to form a plurality of stitch letters each differing in font, the font of the character is not automatically changed in association with the selection of the character.

Referring to U.S. Pat. Nos. 4,557,207 and 4,622,907, stitch pattern data representative of various fonts and stitch pattern have been stored in advance in a memory on font basis. The operator firstly designates the font area in the memory and then depresses a desired alphabetical key to designate a desired stitch pattern, so that the stitch pattern data representative of the designated font and the designated stitch pattern are read out from the memory. In this manner, a desired stitch pattern is formed, however, in the sewing machine thus arranged, it is necessary to select the font each time when the stitching is performed.

According to the prior art stitch pattern sewing machines, when the operator wants to form characters of different fonts successively as shown in FIGS. 6(a) and 6(b), the operator has to enter both font codes and individual character codes according to the desired alphabetical letters to be stitched. It has been tedious and time-consuming to enter such codes.

SUMMARY OF THE INVENTION

In view of the aforesaid drawback of the conventional sewing machine with data generator, it is an object of the present invention to provide a data processor for sewing machines which is capable of processing input data and reliably generating stitch pattern data, such as for fancy stitches for initials, which have various characters or letters of different fonts, simply by selectively entering individual character codes.

According to the present invention, there is provided a data processor for processing input data to produce stitch pattern data used for sequentially stitching letters on materials with a sewing machine, comprising first memory means for storing stitch pattern data regarding stitch letters, the stitch letters being classified into a plurality of groups, each containing a set of letters having essentially the same outline profile different from that of the letters in another group, and for storing character identification codes identifying the stitch letters and their outer profiles, input means for sequentially entering letters to be stitched and outputting letter codes indicative of the entered letters, second memory means for storing preselected outer profiles of the stitch letters in relation to a stitching sequence in which the letters are to be stitched, readout means for reading from the first memory means the stitch pattern data identified by the character identification codes in accordance with the letter codes outputted from the input means and the outer profiles stored in the second memory means, and third memory means for storing the character identification codes read from the first memory means by said readout means.

When desired letters are selected and entered in relation to the letter stitching sequence through the input means, the character identification code is constructed in accordance with the letters entered through the input means and a preselected order of the outer profiles of stitch letters in relation to the stitching sequence in which the letters are to be stitched, and the readout means reads the stitch pattern data identified by the thus constructed character identification code from the first memory means. The stitch pattern data read by the readout means are stored in the third memory means.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 2:
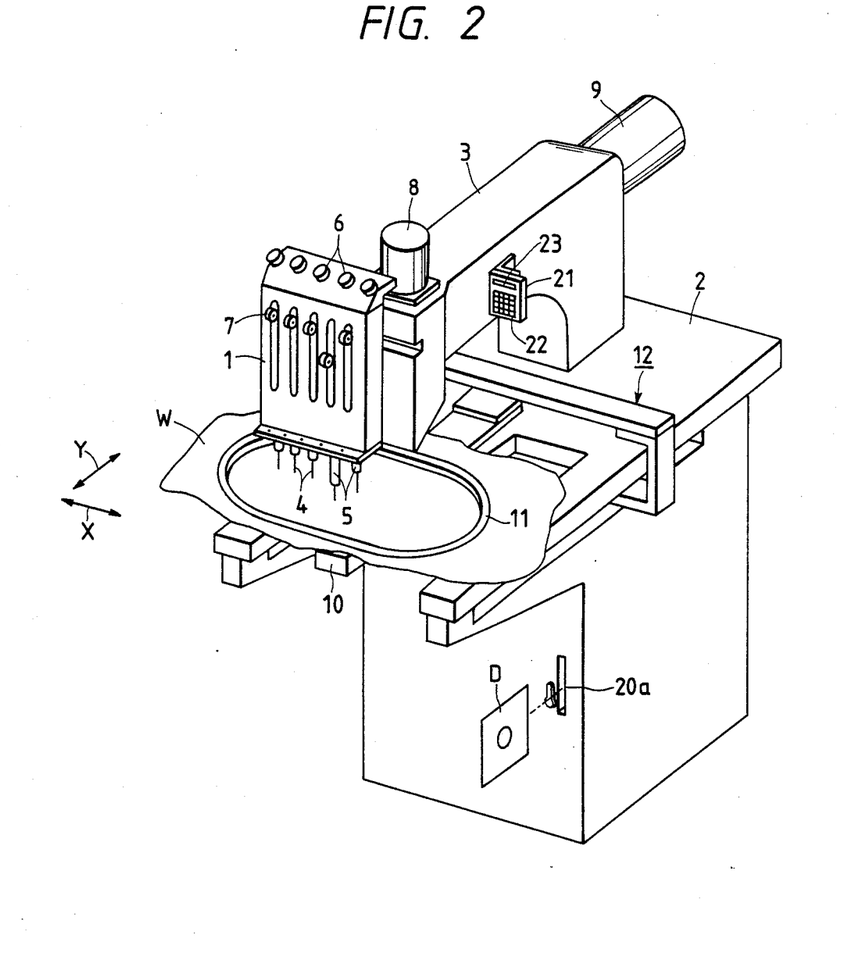
FIG. 2 is a perspective view showing an embroidery sewing machine incorporating the data processor of the present invention.

FIG. 2 shows an embroidery sewing machine which incorporates a data processor according to the present invention. The sewing machine includes a needle bar support casing 1 slidably supported on the front end of a sewing machine arm 3 mounted on a table 2. Five needle bars 5 each having a needle 4 on its lower end are vertically movably supported in the needle bar support casing 1. The needles 4 are supplied with threads of different kinds from thread supply sources (not shown) through thread tensioners 6 and thread takeup arms 7. The needle bar support casing 1 is horizontally slidable by a needle selector motor 8 on the arm 3 to position one of the needle bars 5 in a given operative position.

A motor 9 is mounted on the rear end of the arm 3. Power of the motor 9 is transmitted through a power transmission mechanism (not shown) in the arm 3 to the needle bar 5 in the operative position to move that needle bar 5 up and down. A bed 10 is supported on and projects from the table 2 in underlying relation to the needle bar 5 in the operative position. The bed 10 houses therein a thread loop taker (not shown) which cooperates with the needle bar 5 in forming stitches on a piece of cloth W.

A cloth holder frame 11 by which the piece of cloth W is detachably held is disposed on the table 2. The cloth holder frame 11 is horizontally movable in the directions indicated by the arrows X, Y in synchronism with the vertical movement of the needle bar 5 by a cloth feeder 12 which has a pair of drive motors (not shown). Stitch patterns are formed on the piece of cloth W while the piece of cloth W is being fed and the needle bar 5 is moving up and down.

The data processor of the present invention will be described below with reference to FIG. 1. The data processor includes an external memory 20, serving as a first memory means, comprises a magnetic disk D and a disk drive unit 20a. The magnetic disk D stores a plurality of stitch pattern data associated with character identification codes. As shown in FIGS. 3(a) through 3(c) and 5(a) through (c), the stitch pattern data include individual characters C1 such as letters, symbols (including > and ◊), etc. belonging to a font L and having essentially the same outer profile La, and characters C2, C3 belonging to different fonts C, R and having outer profiles Ca, Ra, respectively, the characters C2, C3 corresponding to the characters C1. These stitch pattern data are representative of relative positions between the needles 4 and the cloth holder frame 11. The stitch pattern data are classified into character groups corresponding to the respective fonts L, C, R.

Figure 3A:
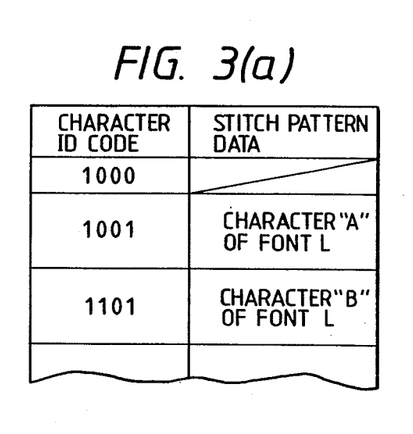
FIGS. 3(a) through 3(g) are tables showing character identification codes and stitch pattern data stored in an external memory of a controller.
Figure 3B:
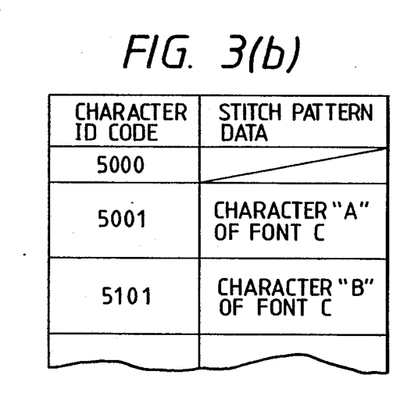
Figure 3C:
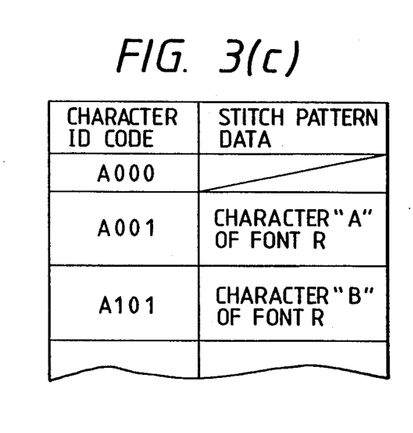
Figure 3D:
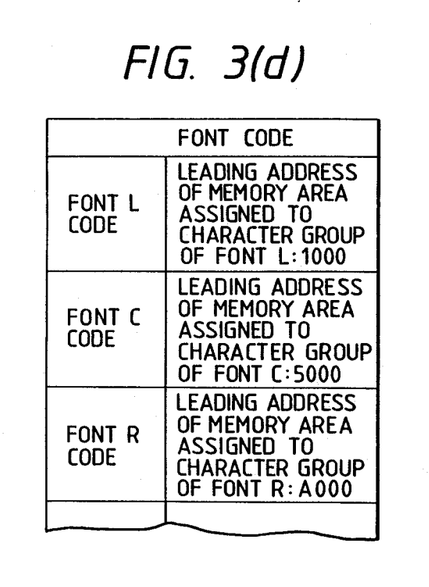
Figure 3E:
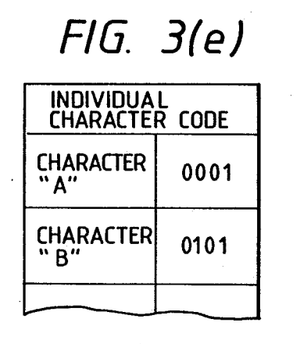
Figure 3F:
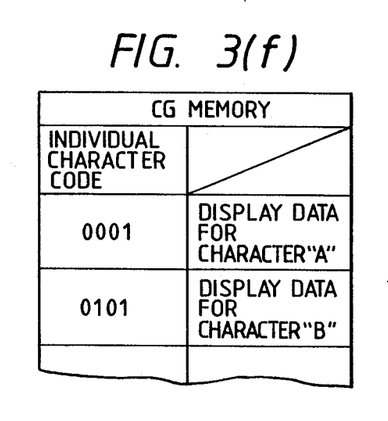
Figure 3G:
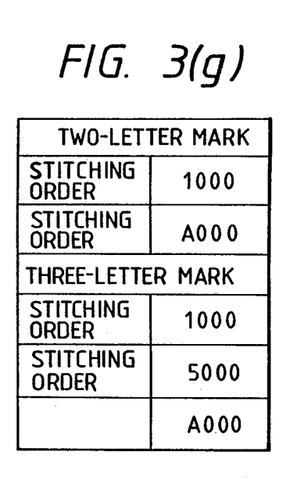

FIGS. 3(a), 3(b) and 3(c) show character identification codes which include font codes (see FIG. 3(d) for identifying the fonts L, C, R, and individual character codes (see FIG. 3(e)) for indicating characters in each of the character groups. As shown in FIG. 3(g), font preselected orders with respect to two- and three-letter marks have been stored in a ROM (read-only memory) 25 serving as a second memory. As shown in FIG. 3(f), display data for the characters are related to the individual character data and stored in a CG (character generator) memory area on the magnetic disk D.

Figure 1:
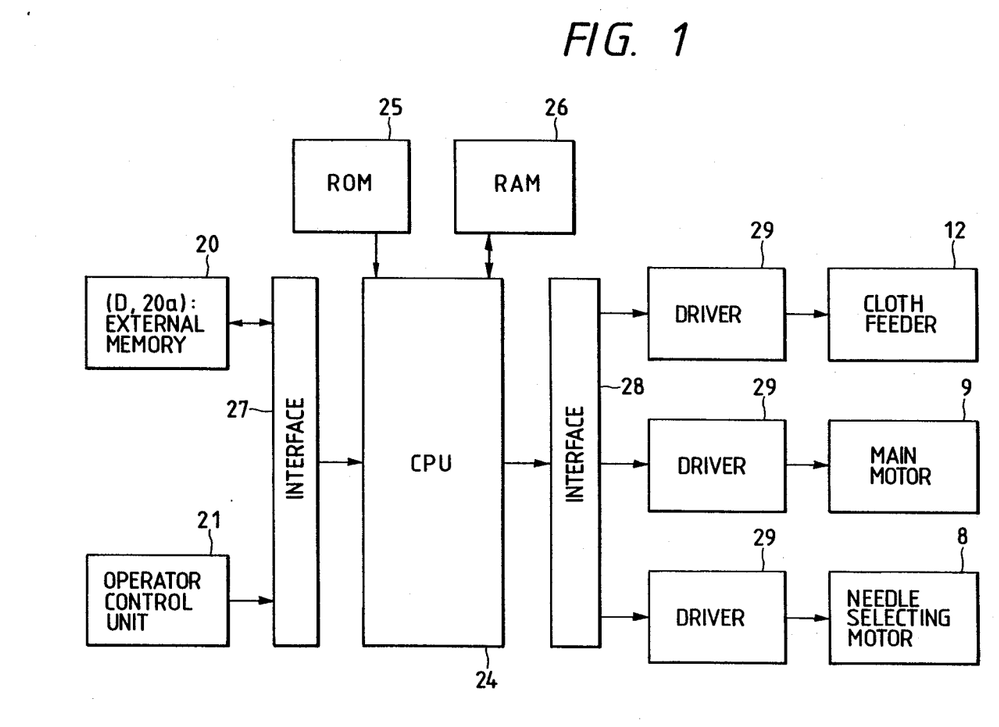
FIG. 1 is a block diagram of a controller of a data processor according to the present invention.

Referring to FIGS. 1 and 2, an operator control unit 21, serving as an input means, is mounted on the arm 3, and has a keyboard 22 and a display unit 23. A CPU (central processing unit) 24, serving as a readout means, has the ROM 25 for further storing control programs for the sewing machine and the data processor, and a RAM (random access memory) 26 serving as a third memory means. By pressing alphabetical letter keys on the keyboard 22, the individual letter codes corresponding to two or three letters are sent through an interface 27 to the CPU 24, which temporarily stores the individual letter codes into the RAM 26. The keyboard 22 is further operated upon to enter the individual symbol codes corresponding to symbols (such as ">" and "◊") which indicate the kinds of outer decorative patterns Sd, Ss. Based on the individual letter codes and font codes, the CPU 24 constructs a set of character identification codes for producing a two-letter mark M2 or a three-letter mark M3 shown in FIGS. 6(a) and 6(b), reads the stitch pattern data corresponding to the constructed set of character identification codes from the external memory 20, and temporarily stores the stitch pattern data into the RAM 26.

In response to a stitching start signal from a start switch, the CPU 24 operates and controls the motors 8, 9 and the cloth feeder 12 through an interface 28 and respective drivers 29 based on the stitch pattern data.

Figure 4:
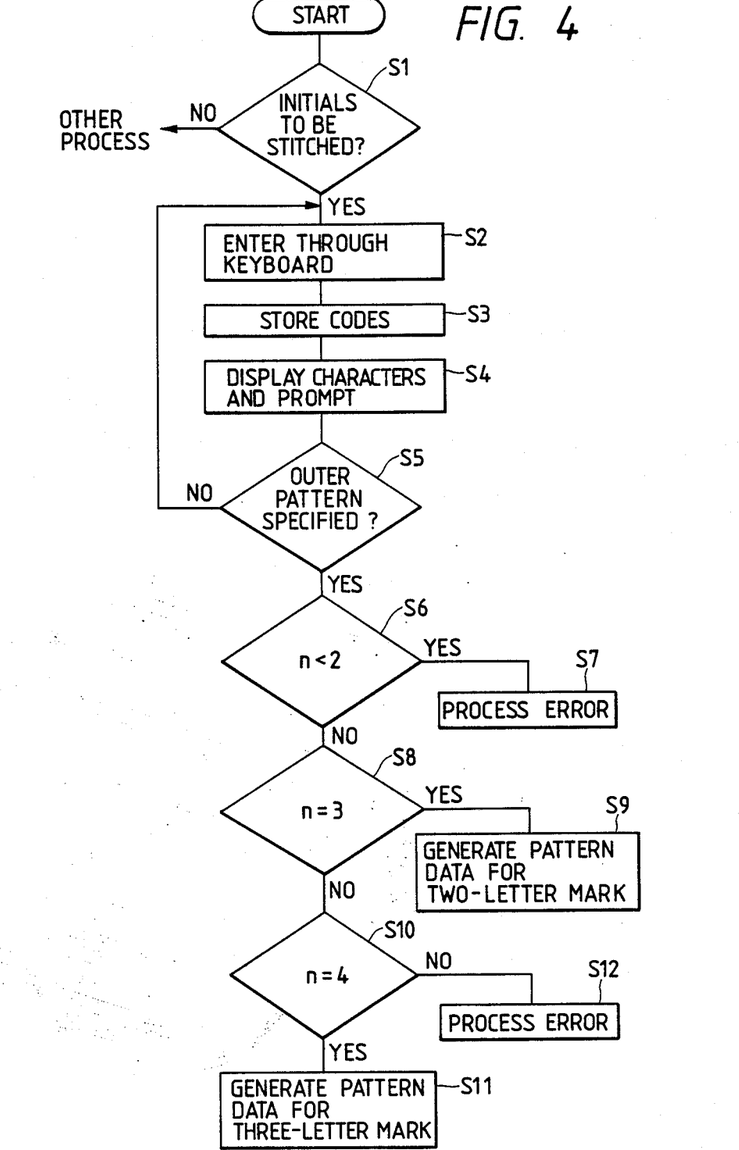
FIG. 4 is a flowchart for description of a control sequence of the controller.
Figure 5A:
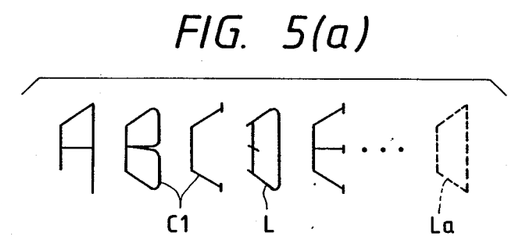
FIGS. 5(a) through 5(c) are diagram showing characters or letters of different outlines.
Figure 5B:
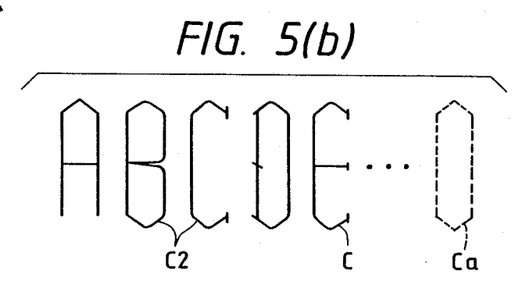
Figure 5C:
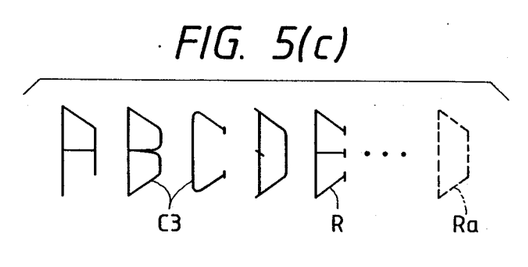

A control sequence of the controller of the data processor will be described with reference to FIG. 4.

To stitch initials indicated by the three-letter mark M3 or the two-letter mark M2 shown in FIGS. 6(a) and 6(b), for example, a mode switch (not shown) on the keyboard 22 is pressed to select an initial stitching mode. Then, in step S1, the selection of the initial stitching mode is confirmed, and the CPU 24 enters the initial stitching mode.

Then, individual letter codes indicating alphabetical letters "R", "G", "B" and symbols "◊" and ">" are entered through the keyboard 22 in step S2. The CPU 24 stores the entered individual letter codes (see FIG. 3(e)) in the RAM 26 in step S3, reads the display data (see FIG. 3(f)) corresponding to the entered individual letter codes from the external memory 20, and displays the alphabetical letters and symbols represented by the display data on the display unit 28 of the operator control unit 21, and also displays a prompt to invite the entry of a next individual letter code on the display unit 28 in step S4.

Each time an individual letter code is entered, the CPU 24 determines whether the entered code is the symbol code, such as for example the one indicating " ◊ " or ">" for an outer decorative pattern of the initial stitches, and whether the end of selection of alphabetical letters and the designation of an outer decorative pattern are indicated by that symbol code, in step S5. Steps S2, S3, S4 are repeated until the answers become YES in step S5.

In the subsequent step S6, it is determined whether or not the number n of entered codes is equal to or less than 2. If affirmative, then any initial stitching is impossible and an error is processed in step S7. If the number n of entered codes is greater than 2 (2 exclusive), then the processing advances to step S8. If the number n is equal to 3, the CPU 24 constructs, in step S9, a character identification code for a two-letter mark in accordance with the individual letter codes sequentially entered from the keyboard 22 and the preselected two-letter mark font code order stored in ROM 25 (see FIG. 3(g)). The CPU 24 then reads the stitch pattern data corresponding to the thus constructed character identification code from the external memory 20, and stores the resultant stitch pattern data in the RAM 26.

For example, when the individual letter codes corresponding to the letters "R" and "B", and the symbol code corresponding to the symbol " ◊ " are entered, the stitch pattern data (see FIGS. 3(a) and 3(b)) for the letters "R" and "B" of the respective fonts L, R and the stitch pattern data for the lozenge-shaped outer profile or pattern are stored in the RAM 26 in the order according to the character stitching sequence.

If the number n of entered codes is 4, then the processing advances from step S10 to step S11. In step S11, the CPU 24 constructs a character identification code for a three-letter mark in accordance with the individual letter codes sequentially entered from the keyboard 22 and the preselected three-letter mark font code order stored in ROM 25 (see FIG. 3(g)), reads the stitch pattern data corresponding to the thus constructed character identification code, and stores the resultant stitch pattern data in the RAM 26.

For example, when the individual letter codes corresponding to the letters "R", "G", "B", and the symbol ">" are entered, the stitch pattern data (see FIGS. 3(a) through 3(c)) for the letters "R", "G", and "B" of the respective fonts L, C, R and the stitch pattern data for the inequality-sign outer profile or pattern are stored in the RAM 26 in the order according to the character stitching sequence.

If the number n of entered codes is 5 or more, then the processing advances from step S10 to step S12 in which an error is processed.

When the two-letter mark M2 (FIG. 6(b)) is to be stitched, the lefthand letter C1, the righthand letter C3, and the outer pattern Ss are successively formed. When the three-letter mark M3 (FIG. 6(a)) is to be stitched, the lefthand letter C1, the central letter C2, and the righthand letter C3 are successively formed, and then the leftmost and rightmost outer pattern elements Sd are formed. Threads between the letters and the outer patterns are prevented from being sewn to the cloth, and hence the finished stitches are neat in appearance.

In the above embodiment, fancy stitch pattern data for stitching initials composed of characters or letters of different fonts can reliably be generated according to the stitching sequence simply by entering the individual letter codes corresponding to the character of the initials.

In order to supervise a plurality of embroidery sewing machines of the above construction, there may be provided a personal computer having a CPU, and the keyboard, and a display units such as a CRT, and the keyboard may be used as an input means for entering individual character codes, and the CPU of the personal computer may be used as a readout means for reading stitch pattern data.

In the illustrated embodiment, an outer decorative pattern is counted as one character, and entered individual letter codes are automatically identified as a two-letter mark when the number of the entered individual character codes is 3, and as a three-letter mark when the number of the entered individual character codes is 4. However, if no outer decorative patterns are to be formed, the entered individual character codes are identified as a two-letter mark when the number of the codes is 2 and as a three-letter mark when the number of the codes is 3.

The selection of a two-letter mark or a three-letter mark may be made directly by the operator through the keyboard.

Although a certain preferred embodiment has been shown and described, it should be understood that many changes and modifications may be made therein without departing from the scope of the appended claims. For example, the present invention is also applicable to the case where four or more than four letter marks are stitched on the piece of cloth.

What is claimed is:

1. A data processor for processing input data to produce stitch pattern data used for sequentially stitching letters on materials with a sewing machine, comprising:
   first memory means for storing stitch pattern data regarding stitch letters, the stitch letters being classified into a plurality of groups, each containing a set of letters having essentially the same outline profile different from that of the letters in another group, and for storing character identification codes identifying the stitch letters and their outer profiles;
   input means for sequentially entering letters to be stitched and outputting letter codes indicative of the entered letters;
   second memory means for storing preselected outer profiles of the stitch letters in relation to a stitching sequence in which the letters are to be stitched;
   readout means for reading from said first memory means the stitch pattern data identified by the character identification codes in accordance with the letter codes outputted from said input means and the outer profiles stored in said second memory means; and
   third memory means for storing the character identification codes read from said first memory means by said readout means.

2. A data processor according to claim 1, wherein each of the character identification codes includes a letter identification code identifying the same letters belonging to different groups and an outer profile identification code identifying the outer profile of the letter identified by the letter identification code.

3. A data processor according to claim 1, wherein said first memory means further stores another data regarding a plurality of symbols and symbol identification codes identifying the plurality of symbols, and said input means further enters symbols to be stitched.

4. A data processor according to claim 2, wherein said first memory means further stores another data regarding a plurality of symbols and symbol identification codes identifying the plurality of symbols, and said input means further enters symbols to be stitched.

5. A data processor according to claim 2, wherein said first memory means comprises letter memory means for storing data regarding letters to be stitched in association with the letter identification codes and outer profile memory means for storing data regarding the outer profile of the letters in association with the outer profile identification code.

6. A data processor according to claim 3, wherein said first memory means comprises letter memory means for storing data regarding letters to be stitched in association with the letter identification codes and outer profile memory means for storing data regarding the outer profile of the letters in association with the outer profile identification code.

7. A data processor according to claim 1, wherein said input means includes display means for displaying the letters entered from said input means.

8. A data processor according to claim 2, wherein said input means includes display means for displaying the letters entered from said input means.

9. A data processor according to claim 3, wherein said input means includes display means for displaying the letters entered from said input means.

* * * * *